United States Patent [19]

Cherry

[11] 4,046,461
[45] Sept. 6, 1977

[54] PRISMATIC PERSPECTIVE CONTROL DEVICE

[76] Inventor: Kenneth F. Cherry, 1533 Eastgate, Toledo, Ohio 43614

[21] Appl. No.: 598,333

[22] Filed: July 23, 1975

[51] Int. Cl.$^2$ ............................................. G02B 7/18
[52] U.S. Cl. ................................................ 350/287
[58] Field of Search .............. 350/182, 185, 193, 257, 350/285, 286, 287, 204

[56] References Cited

U.S. PATENT DOCUMENTS

| 818,553 | 4/1906 | Phillips | 350/185 X |
| 1,307,598 | 6/1919 | Phillips | 350/185 X |
| 2,828,670 | 4/1958 | Luboshez | 350/286 |

FOREIGN PATENT DOCUMENTS

| 1,189 | 1/1916 | United Kingdom | 350/287 |

*Primary Examiner*—F. L. Evans
*Attorney, Agent, or Firm*—Kenneth F. Cherry

[57] ABSTRACT

This invention relates to a device useful in photographic perspective control. More particularly the invention utilizes movable optical prisms to effect perspective control in fixed lens cameras similar to the effect of the convention "view camera".

2 Claims, 3 Drawing Figures

PRISMATIC PERSPECTIVE CONTROL DEVICE

SUMMARY

In photograhic practice the advantage and use of "view cameras" are well known. Generally, a view camera achieves perspective control with a means of changing the attitude of the lens axis with respect to the film.

A similar effect to that of a view camera can be obtained with a conventional single lens reflex camera or other photographic device by placing optical prisms in the light path. Changing the relationship of these prisms with respect to the lens axis will produce effects similar to those obtained in a "view camera" without actual changes in the lens axis to film orientation.

BRIEF DESCRIPTION OF DRAWINGS

FIG. 1 in a view perpendicular to the lens axis 5 showing two prisms 1 connected to tubular structures 2 by a means of mounting inside, shown are a ball and socket type means 8, the tubular structures are connected with slip ring interlocking means 3 providing independent rotation of the tubular structures. A small handle 7 connected to the prisms and extending through the tubular structure provides adjustment of the prism in the tubular structure and reference charactures, 4 provide a means of ascertaining the prism orientation relative to the lens axis. Threaded member 6 provides means of attaching the unit to the lens. This figure shows the prisms adjusted for maximum prism effect. FIG. 2 is a view parallel to the lens axis shown as section A—A in FIG. 1. FIG. 3 shows the prisms adjusted for minimum effect.

Figure 1:
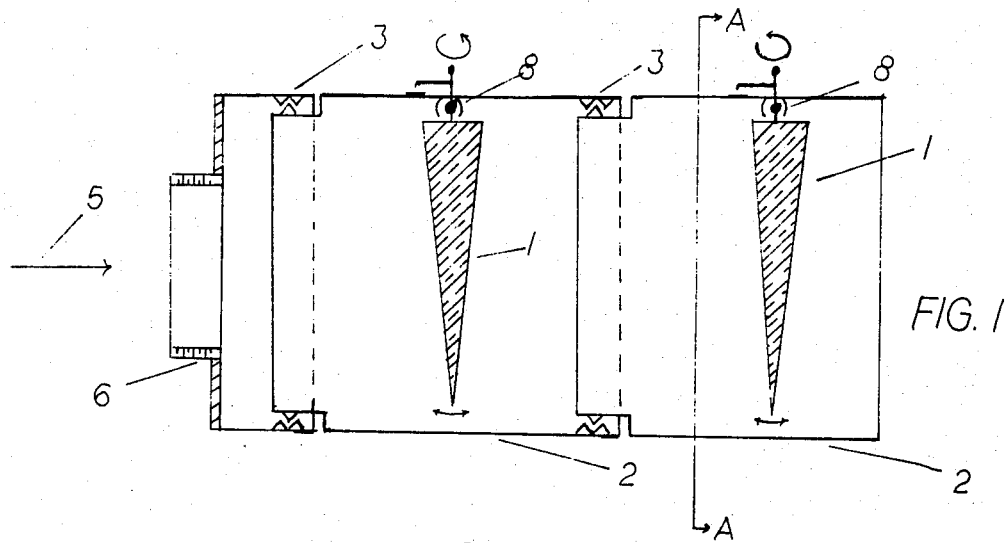
FIG. 1 is a sectional view parallel to the lens axis showing the prisms oriented for maximum effect.
Figure 2:
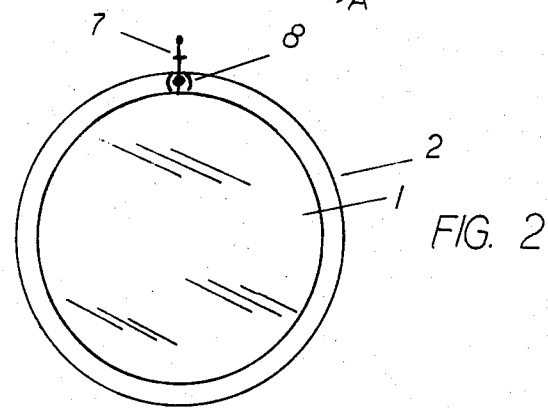
FIG. 2 is a sectional view showing the device perpendicular to the lens axis as indicated in FIG. 1 section line A—A.
Figure 3:
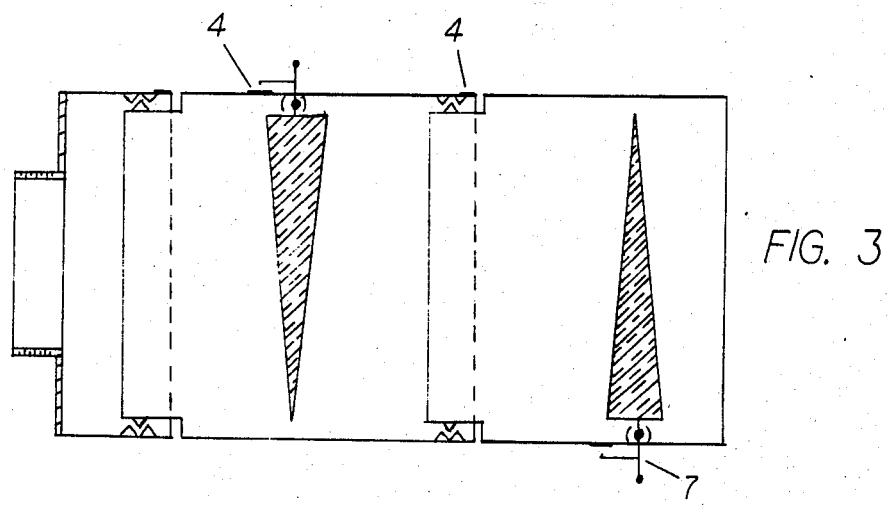
FIG. 3 is a sectional view showing the prisms in a position of minimum effect.

It should be noted that the drawing is not to scale and shorter distances than shown between the prisms would be preferred. Construction of the invention must allow for sufficient surface area of the prisms to minimize the effect known as vignetting.

It has been found that the use of two similar prisms both mounted on a line coincident with the lens axis, between the film and object to be photographed are useful. In particular the effect of a variable prism can be obtained. If one prism is held stationary and the other prism rotated about the lens axis an effect equivalent to no prism will be noted when the thick edge of each prism is directly opposed to the other, further an effect of a prism of twice the angle of either will be obtain when the thick edge of each prism is on the same side of the lens axis. Intermediate effects are possible as the rotation of one prism with respect to the other is performed. This movement is similar to the moving of the lens perpendicular to the film plane in a view camera. Adjustment of both prisms allows effects similar to a view camera with full swing capability. Another effect of perspective changes can be obtained by limited rotation of the prisms about a line perpendicular to the lens axis. The effect is similar to changing the lens axis angular relationship to the film in a view camera known as tilts.

Coated prisms utilizing lens coating material to reduce internal reflections and enhance image quality are of advantage when used with a quality lens system.

Although less versatile then a multiple prism unit a single prism mounted allowing either or both rotational movement about the lens axis and rotation about a line perpendicular to the lens axis is useful in extending the capabilities of a photographic type device with limited swings and tilts or no such adjustments.

Utilizing prisms of a circular shape with 5° to 20° prism angles placed in front of a conventional single lens camera, the prism diameter greater than the diameter of the camera lens body, is believed adequate for the purpose described herein. Any prisms between 0° and over 90° can have use depending on the effect desired.

Mounting the prisms to a lens can be accomplished by several methods, preferred is a standard thread to fit conventional camera lenses thereby providing means of attachment. Securing the prisms, each in a separate tubular structure having either gimbal or ball and socket mounts to attach the prisms inside the tubular structures provides means of mounting inside. Said prisms having a means of adjustment of position and orientation within said tubular structure, further said means of adjustment to be operable from outside said tubular structure. Said tubular structures so constructed as to be attachable to each other and attachment means provided between said tubular structure to allow independent rotation of said tubular structure about the lens axis, thereby providing rotation of the prisms, further one of said tubular structure having a means of attachment to a lens system. In general any method of attaching one or more prisms to a lens system will effect the perspective and result in extended capabilities of that lens system.

Having described the invention I claim:

1. A prismatic perspective control device comprising a prism system and mounting means for said prism system providing connection to a lens and adjustment of said prism system position relative to said lens and means of ascertaining the position of said prism system relative to said lens wherein said mounting means comprises at least two tubular structures connectable to each other with slip ring interlocking means providing rotation of said tubular structures relative to each other; further each said tubular structure having means for mounting at least one prism therein and for providing independent movement of said prism within said tubular structure; one of said tubular structures is provided with means for attachment to a lens, said means for attachment comprising a third tubular structure having slip rings similar to said slip ring interlocking means between said tubular structures and a connective ring providing mounting means for connection to a lens.

2. The invention of claim 1 wherein said means of ascertaining position comprises a scale imprinted on each tubular structure showing the relative position of the elements of said prism system.

* * * * *